United States Patent

[11] 3,603,930

[72] Inventor Ronald H. Britt
Ilford, Essex, England
[21] Appl. No. 841,506
[22] Filed July 14, 1969
[45] Patented Sept. 7, 1971
[73] Assignee The Plessey Company Limited
Ilford, Essex, England
[32] Priority July 18, 1968
[33] Great Britain
[31] 34245/68

[54] OPTICAL CHARACTER RECOGNITION SYSTEM INCLUDING SCANNED DIODE MATRIX

3 Claims, 1 Drawing Fig.

[52] U.S. Cl. 340/146.3 J
[51] Int. Cl. G06k 9/06
[50] Field of Search 340/146.3

[56] References Cited

UNITED STATES PATENTS

| | | | |
|---|---|---|---|
| 3,164,805 | 1/1965 | Holt et al. | 340/146.3 |
| 3,215,981 | 11/1965 | Golay | 340/146.3 |
| 3,309,667 | 3/1967 | Feissel et al. | 340/146.3 |
| 3,400,216 | 9/1968 | Newman | 340/146.3 X |
| 3,430,198 | 2/1969 | Gattner et al. | 340/146.3 |
| 3,496,542 | 2/1970 | Rabinow | 340/146.3 |

*Primary Examiner*—Maynard R. Wilbur
*Assistant Examiner*—Leo H. Boudreau
*Attorney*—Blum, Moscovitz, Friedman and Kaplan

ABSTRACT: An optical character recognition system comprising a photohead which scans successively a character image to be recognized information being transferred during the scan into a number of tapped delay lines such that information resulting from one complete scan can be presented simultaneously to a detector arrangement capable of recognizing predetermined features of a plurality of different characters, signals indicative of such recognition being fed into a multistage shift register the contents of which are sampled by character detector means which provides a final output signal when predetermined signal state is obtained in selected stages of the shift register.

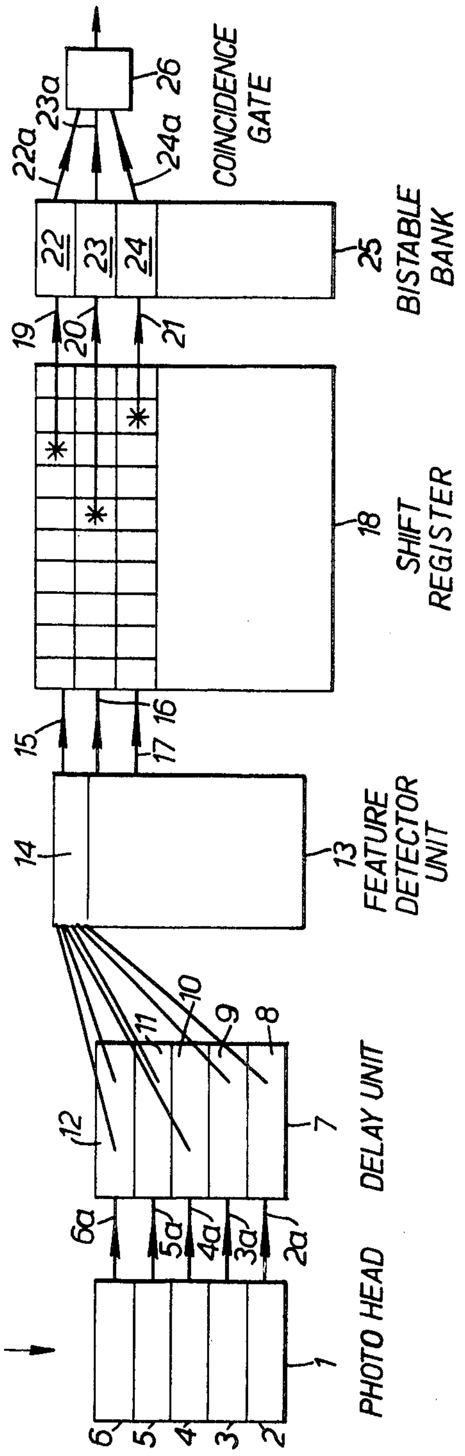
PHOTO HEAD
DELAY UNIT
FEATURE DETECTOR UNIT
SHIFT REGISTER
BISTABLE BANK
COINCIDENCE GATE
1
2
3
4
5
6
2a
3a
4a
5a
6a
7
8
9
10
11
12
13
14
15
16
17
18
19
20
21
22
23
24
25
26
22a
23a
24a

OPTICAL CHARACTER RECOGNITION SYSTEM INCLUDING SCANNED DIODE MATRIX

This invention relates to optical character recognition systems.

An optical character recognition system according to the invention comprises a photohead adapted to scan repeatedly a character image to be recognized, information being transferred during the scan from the photohead to a number of tapped delay lines the length of which are such that information relating to substantially the whole of a character image can be stored therein and presented simultaneously to a detector arrangement capable of recognizing predetermined features of a plurality of different characters, signals indicative of such recognition being fed into a multistage shift register the contents of which are sampled by character detector means which provides a final output signal when predetermined signal states obtain in selected stages of the shift register.

Some exemplary embodiments of the invention will now be described with reference to the accompanying drawing which is a generally block schematic diagram of an optical character recognition system.

The system comprises a photohead 1 which is described in detail in the specifications accompanying our copending British patent applications Nos. 34532/68 and 34247/68. The head comprises a matrix of five columns 2, 3, 4, 5 and 6 each of which includes a row of 72 photodiodes. The 72 photodiodes in each column are scanned successively, by conventional scanning circuitry for example, in one scan cycle all columns being scanned simultaneously in a time of 14.4 microseconds. The characters to be recognized are passed across the head in the direction of the arrow at a speed which is slow compared with the scanning speed. The resulting video waveform produced by the scan from the photodiodes is fed one waveform from each column along lines **6*a* 5*a* 4*a* 3*a* and 2*a* into a delay unit 7. The delay unit comprises five delay lines 8, 9, 10, 11 and 12**.

Each delay line has 25 individual sections each of which delays the video signal by 0.2 microsecond to provide in respect of each delay line a total of 5 microseconds delay. The length of the column of the photohead are arranged to be 3 character heights long, and thus at some time during the period when a character is scanned a complete set of information representative of the character is simultaneously made available at selective ones of 5 × 25 equals 125 sections of the delay unit. Although any conventional delay line may be utilized in a system according to the present invention a preferred delay line is more fully described in the specifications which accompany our copending British patent applications Nos. 34248/68 and 34246/68.

One of the principles of the present system is to "look" for various features of the character. For example when a particular character is placed in relation to the photodiode matrix so as to exclude light from some photodiodes and permit light to fall on other photodiodes, certain of the photodiodes which form the matrix may be considered to be black and other of the photodiodes of the matrix may be considered to be white and this pattern which is represented by signals in the sections of the delay unit 7 may be considered to be a feature.

The same feature may occur in several different characters but in the present system the features are so chosen that each character has a unique and distinctive combination of features. The presence or absence of a feature is detected by means of a feature detector unit 13 comprising 24 feature detectors each of which is connected to selected sections of the delay unit. The presence or absence of a feature is indicated in accordance with the signals present at these different sections of the delay unit. One feature detector 14 of the delay unit 13 is shown schematically connected to various sections of the delay unit 13. The output of a particular section of the delay line unit 13 represents in accordance with its sign and/or magnitude a black point which is part of the character or a white point which is part of the background to the character or some intermediate shade which is part of each. Thus when a particular feature is present a predetermined number of black and white points will be detected at specified positions or sections of the shift register. It will be appreciated therefore that the feature detector unit may simply comprise a gating arrangement which affords an output when certain specified signals are applied thereto from selected sections of the delay unit 13.

The feature detection principle is fully described in our copending British application No. 34244/68 and one specific circuit for performing the feature detection function is described in our copending British patent application No. 34242/68.

Although not shown, the other 23 feature detectors (not hereinbefore referred to) are also connected to selected sections of the delay unit 7.

There are 24 output lines from the feature detector unit 13, one from each feature detector, each line being utilized to carry a signal representative of a different feature. In the block diagram only three of these output lines 15, 16 and 17 are shown. The signal on the output line 15 will be assumed for the purposes of the present explanation to indicate that a feature has been detected which is common to the OCR'B' font characters 2 and 3; a signal on output line 16 will be assumed to indicate that a feature has been detected which is common to the OCR'B' font characters 2 and 8 and a signal on output line 17 will be assumed to indicate that a feature has been detected which is common to the OCR'B' font characters 2 and E.

The 24 feature detectors are connected via their associated output lines to a shift register unit having 24 stages one for each feature detector each shift register stage having 10 bits. Signals representative of the features recognized are stepped progressively through the 10 bits of the corresponding shift register stage. This arrangement has the advantage that the detection of time spaced features may be achieved by examining the state of different bits in various stages simultaneously thereby facilitating the recognition of a complete character.

This examination is effected by means of bistable devices connected to selected bits of the shift register unit 18 and arranged to feed a coincidence gate so that contemporaneous signals in these bits produce corresponding outputs from the bistable devices to open the coincidence gate and provide a final output signal when several features characteristic of the same character has been detected to indicate that the character to which these features are common has been recognized.

In the present example starred sections of the shift register 18 are assumed to be connected via lines 19, 20 and 21 to bistable devices 22, 23 and 24 respectively which form part of a bank 25 of bistable devices. The starred sections will each be assumed to carry a stored signal which indicates that a feature has been detected, each star is indicative of a different feature the uppermost star being representative of the stored signal fed from the line 15 representing a feature characteristic of OCR'B' font characters 2 or 3. The star in the second row similarly represents a feature characteristic of 2 or 8 and the star in the third row represents a feature characteristic of 2 or E. The bistable devices 22, 23 and 24 are caused to operate simultaneously by the stored signals and outputs therefrom are simultaneously fed along output lines **22*a*, 23*a* and 24*a* to 'enable' a coincidence gate 26 which provides a final output signal indicative of the presence of an OCR'B' font character 2**.

It will be appreciated that the three output lines from the shift register unit 18 namely 19, 20 and 21 are energized by three times displaced states in the shift register to produce the final output signal which indicates that an OCR'B' font character 2 has been recognized. The various other sections of the shift register are selectively connected to other bistable devices of the bistable bank 25 so as to provide an indication in a similar manner when a certain number of features has been detected thereby to indicate that the character common to those features has been recognized, one coincidence gate being provided for each character.

The aforementioned mode of operation wherein predetermined sections in various stages of the shift register corresponds to certain signal states to provide an output recognition signal when a complete character has been recognized is fully described in our copending British patent application No. 32243/68.

The system as just before described may be used for the recognition of so-called nonstylized characters such as those which have been hereinbefore referred to of the OCR'B' font as opposed to stylized OCR'A' font or E13 B characters, which may also be recognized with suitable choice of features.

It will also be appreciated that although exemplary embodiments of the photohead, the delay unit, the feature detector unit and the shift registers are described in the aforementioned copending Great Britain patent applications, these circuits and elements are well known in general and any equivalent circuit may be employed in this system without departing from the scope of the present invention.

What We Claim Is:

1. An optical character recognition system comprising a photo head which includes a photodiode matrix defined by rows and columns of photodiodes adapted repeatedly to scan a character image to be recognized, a number of tapped delay lines to which information is transferred during the scan from the photohead, the length of said delay lines being such that information relating substantially to the whole of a character image can be stored therein, a detector arrangement capable of recognizing predetermined features of a plurality of different characters comprising a number of similar gating arrangements to each of which signals from selected taps on the delay lines are fed to provide output signals when the signals from the said taps are representative of a predetermined number of black and white points on the photodiode matrix indicative of a feature of the character scanned, a separate distinctive feature being detected by each gating arrangement, a multistage shift register into which output signals from said detector are fed and character detector means which provides a final output signal indicating that a particular character has been recognized when predetermined signal states obtain in selected stages of the said register.

2. An optical character recognition system as claimed in claim 1 wherein the multistage shift register includes one stage for each gating arrangement, signals representative of various features being stepped through a number of shift register stage bits the same number of bits being provided for each stage.

3. An optical character recognition system as claimed in claim 2 wherein the character detector means comprises a plurality of bistable devices each of which operates responsively to the signal state in a predetermined bit of the shift register, one bit to each bistable device, the outputs from selected bistable devices being applied to coincidence gates, one per character, whereby a character recognition signal from an appropriate coincidence gate is provided when signals indicative of predetermined features of the character scanned obtains in the selected bits of the shift register.